(12) United States Patent
Walsh et al.

(10) Patent No.: US 9,551,807 B2
(45) Date of Patent: Jan. 24, 2017

(54) NMR DETECTION OF WATER AND HYDROCARBONS DURING INDUCED ALTERATION PROCESSES

(71) Applicants: David O. Walsh, Mukilteo, WA (US); Elliot D. Grunewald, Seattle, WA (US)

(72) Inventors: David O. Walsh, Mukilteo, WA (US); Elliot D. Grunewald, Seattle, WA (US)

(73) Assignee: VISTA CLARA INC., Mukilteo, WA (US)

( * ) Notice: Subject to any disclaimer, the term of this patent is extended or adjusted under 35 U.S.C. 154(b) by 896 days.

(21) Appl. No.: 13/874,655

(22) Filed: May 1, 2013

(65) Prior Publication Data

US 2013/0293228 A1 Nov. 7, 2013

Related U.S. Application Data

(60) Provisional application No. 61/641,164, filed on May 1, 2012.

(51) Int. Cl.
*G01V 3/32* (2006.01)

(52) U.S. Cl.
CPC .................................... *G01V 3/32* (2013.01)

(58) Field of Classification Search
CPC ............................................................. G01V 3/32
See application file for complete search history.

(56) References Cited

U.S. PATENT DOCUMENTS

| | | |
|---|---|---|
| 6,160,398 A | 12/2000 | Walsh |
| 6,630,357 B2 | 10/2003 | Mirotchnik |
| 6,690,166 B2 * | 2/2004 | Ni .................. G01R 33/4816 324/307 |
| 6,755,246 B2 | 6/2004 | Chen |
| 7,032,661 B2 * | 4/2006 | Georgi .................. E21B 49/00 166/250.01 |
| 7,466,128 B2 | 12/2008 | Walsh |
| 7,523,002 B2 * | 4/2009 | Griffiths ............. E21B 44/00 367/27 |
| 7,579,833 B2 | 8/2009 | Shorey |
| 7,804,296 B2 | 9/2010 | Flaum |

(Continued)

FOREIGN PATENT DOCUMENTS

EP 2341372 A1 7/2011

OTHER PUBLICATIONS

Canadian Intellectual Property Office, Office Action in Canada Patent Application CA 2,814,460, Dec. 2, 2014.

*Primary Examiner* — Dixomara Vargas
(74) *Attorney, Agent, or Firm* — Nathaniel A. Gilder; Jensen & Puntigam, P.S.

(57) ABSTRACT

Technologies applicable to NMR detection of water and hydrocarbons during induced alteration processes are disclosed. NMR measurements may be used to monitor properties of subsurface fluids within a subsurface formation. NMR measurement devices may be deployed proximal to or within a subsurface formation that contains hydrocarbons. Multiple NMR measurements may be performed during an induced alteration process applied to the subsurface formation to determine properties of the subsurface formation or fluid as the induced alteration process progresses. Changes in properties of the subsurface formation or fluid may be determined and may be used to determine efficacy of, optimize, or otherwise modify the induced alteration process.

24 Claims, 8 Drawing Sheets

(56) References Cited

U.S. PATENT DOCUMENTS

| | | | |
|---|---|---|---|
| 7,886,825 B2* | 2/2011 | Van Hal | E21B 36/008 166/300 |
| 7,986,143 B2 | 7/2011 | Walsh | |
| 8,283,174 B2* | 10/2012 | Van Hal | E21B 36/008 166/250.1 |
| 8,610,431 B2* | 12/2013 | Chen | G01V 3/32 324/303 |
| 8,736,264 B2* | 5/2014 | Walsh | G01N 24/081 324/303 |
| 2011/0109311 A1 | 5/2011 | Walsh | |
| 2012/0286779 A1 | 11/2012 | Walsh | |

\* cited by examiner

NMR DETECTION OF WATER AND HYDROCARBONS DURING INDUCED ALTERATION PROCESSES

CROSS REFERENCE TO RELATED APPLICATIONS

Priority is claimed to U.S. Provisional Patent Application No. 61/641,164, filed on 1 May 2012, entitled "IN-SITU NMR DETECTION OF WATER AND HYDROCARBONS DURING ENHANCED RECOVERY PRODUCTION," the disclosure of which is incorporated herein by reference in its entirety.

BACKGROUND

Large deposits of heavy oils exist in the near surface in many places, including, e.g., Canada and South America. Certain heavy oil deposits are referred to variously as sand oils, tar sands and bitumen. These heavy oil deposits are often located close to the surface of the Earth. However, at natural ambient temperatures in the subsurface these heavy oils often cannot be extracted by conventional means, because the viscosity of these hydrocarbons is typically too high to enable fluid flow at ambient near surface Earth temperatures.

There also exist many locations where hydrocarbons are present as contaminants in the shallow subsurface. In some cases these hydrocarbons may be introduced to the subsurface by accidental spills or leaks in underground storage tanks. Removing these contaminants can be challenging because they are not in the aqueous phase and may have viscosity and wetting properties that differ from groundwater and may prevent the contaminant from flowing into wells.

Various induced alteration processes are sometimes used to reduce the viscosity and/or change other properties of hydrocarbons so they can be produced or otherwise removed from a subsurface formation. Such techniques may include stimulating a reservoir formation thermally with heat or chemically with solvents, and may be generally referred to generally as heavy oil "stimulation" or "enhanced oil recovery (EOR)" techniques. Thermal recovery stimulation may include, for example, the use of steam, as in the established method of steam-injection and steam assisted gravity drainage (known by the acronym SAGD). Thermal stimulation may alternatively or additionally include in-situ combustion of hydrocarbons and microwave heating. Chemical recovery stimulation methods include, for example, vapor extraction, known by the acronym VAPEX.

Accurate measurement is useful in selecting heavy oil reservoirs as well as optimizing EOR operations in heavy oil reservoirs or contaminated sites. As a result, there is an ongoing need in the industry to improve measurement techniques, whether by improving measurement accuracy, improving measurement timing and frequency, increasing the different types of data that can be measured, improving the ease of making measurements, improving the cost of making measurements, increasing the different conditions under which measurements can be made, or otherwise.

Nuclear Magnetic Resonance (NMR) systems have been in use for many years and can be used to provide imaging and/or analysis of a sample being tested. For example, U.S. Pat. No. 6,160,398, U.S. Pat. No. 7,466,128, U.S. Pat. No. 7,986,143, U.S. patent application Ser. No. 12/914,138, and U.S. patent application Ser. No. 13/104,721 describe a variety of NMR technologies, and are incorporated herein by reference. Various different types of NMR include medical NMR, often referred to as magnetic resonance imaging (MRI), and geophysical NMR for measuring properties of Earth formations, including surface NMR and logging NMR. While there is some overlap in the technologies that may be applied in MRI and geophysical NMR, the samples being measured and the environments in which measurements are performed are different, leading to many differences in the technologies applied.

In general, NMR measurement involves utilizing or generating a static magnetic field within a sample volume, emitting one or more electromagnetic pulses into the sample volume, and detecting NMR responses from the sample volume. In some cases, NMR measurement involves emitting multiple electromagnetic pulses in rapid succession and measuring the NMR responses between the electromagnetic pulses. The measured NMR responses provide useful information about the sample volume.

NMR measurements may be used to detect, for example, the abundance of hydrogen contained within an underground sample volume, and NMR relaxation times within a sample. Detected hydrogen abundance and NMR relaxation times may be used to characterize many properties of fluid-bearing formations underground, such as the porosity, total quantity of fluids, fluid composition, fluid viscosity, pore size, wettability, and permeability of the sample. This disclosure is therefore directed to applications of NMR to detect water and hydrocarbons during induced alteration processes.

SUMMARY

Technologies including devices and methods applicable to NMR detection of water and hydrocarbons during induced alteration processes are disclosed. Some example methods may include methods for monitoring, via NMR measurements, properties of subsurface fluids within a subsurface formation. In methods employing surface NMR measurement devices, surface NMR measurement devices may be deployed near the surface of the Earth and proximal to a subsurface formation that contains hydrocarbons, wherein the surface NMR measurement devices are adapted to use the Earth's magnetic field as a background magnetic field for surface NMR measurements. Two or more surface NMR measurements may be performed with the surface NMR measurement devices, wherein at least one first surface NMR measurement is performed at a first time before or during an induced alteration process applied to the subsurface formation, and wherein at least one second surface NMR measurement is performed at a second time during or after an induced alteration process applied to the subsurface formation.

The surface NMR measurement devices may be used to detect, for each of the two or more surface NMR measurements, NMR signals from one or more types of underground pore fluids within the subsurface formation. Detected NMR signals for each of the two or more surface NMR measurements may be analyzed to determine properties of the subsurface formation or fluid, such as NMR signal amplitude, NMR relaxation times, NMR relaxation time distribution, formation porosity, formation permeability, fluid type, fluid volume fraction, hydrocarbon saturation, fluid diffusion coefficient, fluid viscosity, and formation wetting state. Changes in properties of the subsurface formation or fluid may be determined, e.g., changes between the time of the first surface NMR measurement before or during the induced alteration process applied to the subsurface formation, and the time of the second surface NMR measurement performed during or after the induced alteration process.

In methods employing borehole NMR measurement devices, borehole NMR measurement devices may be deployed within a subsurface formation that contains hydrocarbons and two or more borehole NMR measurements may be performed, wherein a first borehole NMR measurement is performed at a first time before or during an induced alteration process applied, e.g., as part of an Enhanced Oil Recovery (EOR) production process, to the subsurface formation, and wherein a second borehole NMR measurement is performed at a second time during or after the induced alteration process. Detected NMR signals for each of the two or more borehole NMR measurements may be analyzed to determine properties of the subsurface formation or fluid, such as those listed above. Changes in properties of the subsurface formation or fluid may be determined, e.g., changes between the time of the first borehole NMR measurement before or during the induced alteration process applied to the subsurface formation, and the time of the second borehole NMR measurement performed during or after the induced alteration process.

Some example devices may include NMR measurement control apparatus adapted to control measurements of properties of subsurface fluids within a subsurface formation during induced alteration processes. NMR measurement control apparatus may comprise, e.g., an NMR measurement scheduler adapted to perform two or more NMR measurements with an NMR measurement device, wherein at least one first NMR measurement of said two or more NMR measurements is performed at a first time before or during an induced alteration process applied to the subsurface formation, and wherein at least one second NMR measurement of said two or more NMR measurements is performed at a second time during or after an induced alteration process applied to the subsurface formation, and wherein the NMR measurement scheduling device is adapted to schedule the two or more NMR measurements according to a rate or stage of the induced alteration process.

The NMR measurement device may be adapted to detect for each of the two or more NMR measurements, NMR signals from one or more types of underground pore fluids within the subsurface formation, and to analyze the NMR signals for each of the two or more borehole NMR measurements to determine, for each of the two or more borehole NMR measurements, one or more properties of the subsurface formation or fluid, such as the properties listed above. The NMR measurement control apparatus may also include a subsurface formation or fluid property monitor configured to determine a change in at least one property of the subsurface formation or fluid between the first NMR measurement at the first time before or during the induced alteration process, and the second NMR measurement performed at a second time during or after the induced alteration process applied to the subsurface formation. Further aspects and variations of the various embodiments are discussed in detail below.

BRIEF DESCRIPTION OF THE DRAWINGS

Various features and attendant advantages of the disclosed technologies will become fully appreciated when considered in conjunction with the accompanying drawings, in which like reference characters designate the same or similar parts throughout the several views, and wherein.

DETAILED DESCRIPTION

Figure 1:
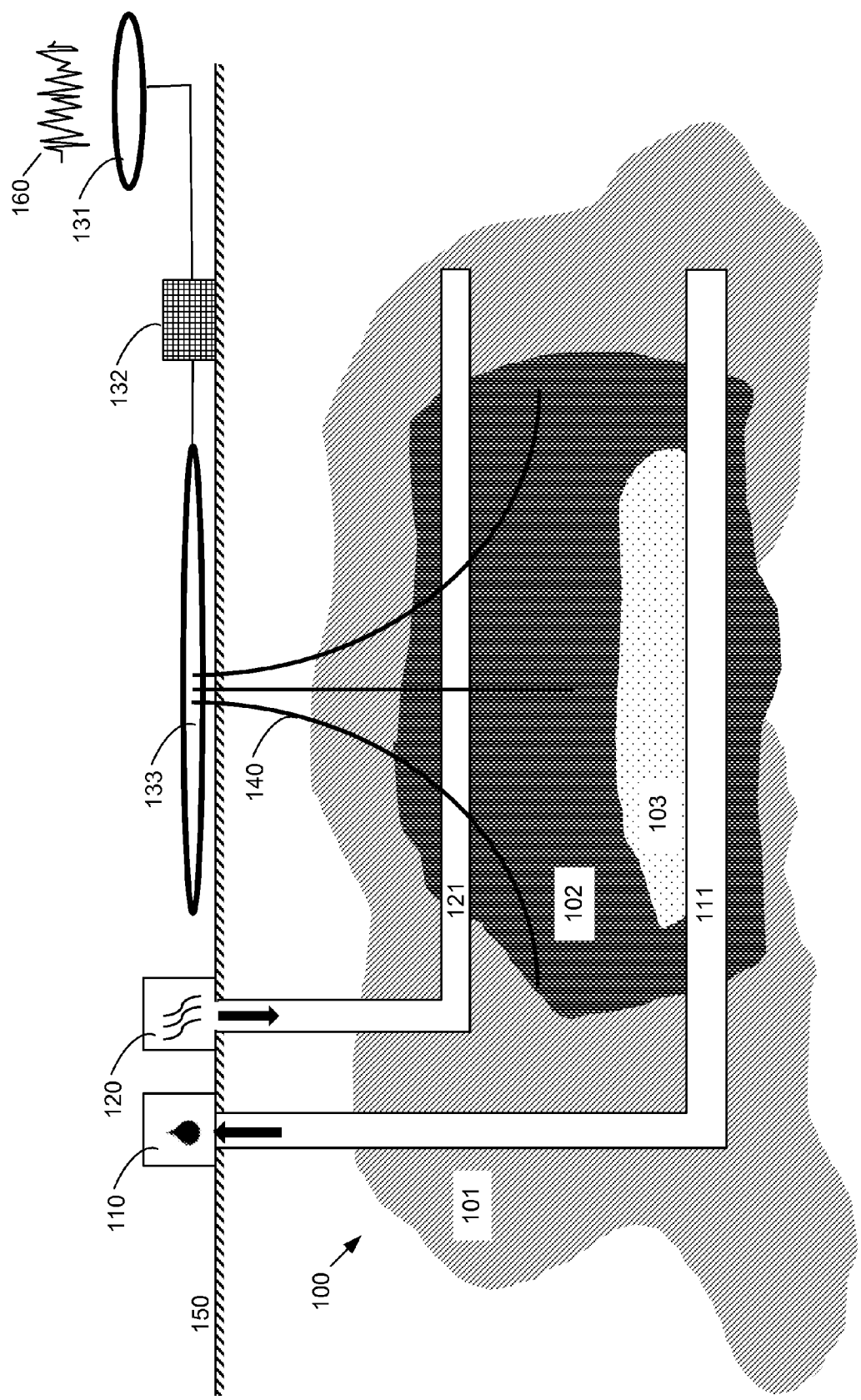
FIG. 1 illustrates an example embodiment in which a surface NMR apparatus is used to measure and monitor water and/or a hydrocarbon body during induced alteration processes in a configuration with horizontal stimulation and production wells.

Prior to explaining embodiments of the invention in detail, it is to be understood that the invention is not limited to the details of construction or arrangements of the components and method steps set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

The field of the invention is NMR and its application to detect water and hydrocarbons in subsurface Earth formations. More specifically, embodiments may address problems of detecting and characterizing changes in pore solids and fluids, including both water and hydrocarbons, as a result of stimulation methods or other induced alteration processes that cause formation properties such as temperature, chemistry, or other properties to change.

In some embodiments, technologies including methods, devices, and computer readable media applicable to NMR detection of water and hydrocarbons during induced alteration processes are disclosed. NMR measurements may be used to monitor properties of subsurface fluids within a subsurface formation. NMR measurement devices may be deployed proximal to or within a subsurface formation that contains hydrocarbons. Multiple NMR measurements may be performed during an induced alteration process applied to the subsurface formation to determine properties of the subsurface formation or fluid as the induced alteration process progresses. Changes in properties of the subsurface formation or fluid may be determined and may be used to determine efficacy of, optimize, or otherwise modify the induced alteration process.

In some embodiments, technologies disclosed herein may be applied in the context of heavy oil extraction. In order to select and optimize EOR operations in heavy oil reservoirs, it is important to determine the conditions of the reservoir formation and fluids before, during, and/or after operational phases of the EOR induced alteration process. For example it sometimes valuable to know the porosity, fluid composition, volume fraction of the fluid phases, fluid viscosity, pore size, wettability, and permeability of the formation. Further, it is sometimes valuable to know these parameters at various different times during an EOR induced alteration process, as well as at one or more specific positions, and/or to obtain a representative image of the variation in these parameters spatially throughout the subsurface.

Given that NMR is sensitive to many of the relevant formation and fluid parameters of value in heavy oil EOR, apparatus and methods for acquiring NMR measurements in heavy oil environments during induced alteration processes are desirable. In particular there is a need for NMR apparatus and methods that can monitor changes in subsurface formations and fluids during stimulation processes of EOR operations.

Some induced alteration processes for extracting heavy oil deposits or hydrocarbon contaminants from subsurface Earth formations involve thermal alteration processes, e.g. by the injection of steam, hot water, or other heated gasses or fluids into the subsurface formation. The injection of such heated fluids or gasses causes the temperature of the formation and the heavy oil deposit to rise. The rise in temperature of the heavy oil may cause a decrease in the viscosity of the oil, enabling it to move as a fluid through the subsurface formation. Hence, the heavy oil may be heated in-situ and may change into a more fluid phase which can flow to an extraction well and be extracted to the surface. This process often produces a mixture or emulsion of hot water, heated heavy oil in a state of reduced viscosity, and other fluid agents used to extract the heavy oil. The heavy oil may be separated from the other components of the emulsion at the surface, following extraction of the emulsion.

In some cases, heat may also be introduced to stimulate a subsurface formation by forcing ignition and combustion of portions of a hydrocarbon reservoir within the subsurface formation. Such methodologies may be referred to as "in-situ combustion". Other induced alteration processes adapted to thermally stimulate a subsurface formation include, for example, the use of emitted microwave energy.

Other induced alteration processes for extracting heavy oil deposits from subsurface Earth formations may include chemical alteration processes, such as injection or introduction of solvents or other chemicals into the subsurface formation. Chemical solvents may be injected into subsurface formations as a liquid or gas phase. Variants of such methods may be referred to as "vapor extraction" (VAPEX). In example VAPEX processes, injected chemicals act upon the heavy oil in-situ, to decrease its viscosity and hence enable improved extraction.

Other example induced alteration processes may comprise, e.g., injecting a biological agent into a subsurface formation, wherein the biological agent is adapted to cause a chemical alteration, through metabolic bacterial processes, of at least one type of underground pore fluid in the subsurface formation.

A variety of NMR measurement techniques may be used to detect and characterize subsurface fluids, such as water and hydrocarbons, within a subsurface Earth formation. These NMR measurement techniques can also use the NMR signal properties of any detected fluids to characterize properties of the subsurface formation and formation fluids including porosity, permeability, volume fractions of multiple fluid phases, fluid viscosity, fluid diffusion coefficient, and formation wettability.

For example, in some embodiments, surface NMR tools may be applied to detecting and characterizing water and hydrocarbons in near-surface formations. Surface NMR techniques may use one or more loops of wire arranged on the surface of the Earth, and may perform NMR detection in the Earth's static magnetic field. NMR excitation of subsurface fluids is caused by transmitting large current pulses at the Larmor frequency through one or more of the surface loops, and detection of the resulting magnetic field from precessing NMR processes is accomplished by sensing the induced voltage on one or more of the surface loops. In many cases a same loop may be used for both transmission and detection, although the use of different loops for transmission and detection is also technically feasible. Surface NMR techniques have been most widely applied to detect groundwater and characterize groundwater aquifer properties, but this disclosure appreciates that surface NMR techniques are capable of detecting hydrocarbons in the near surface, as well as detecting groundwater and hydrocarbons simultaneously.

In some embodiments, borehole NMR logging tools may be applied to detect and characterize water and hydrocarbons within subsurface Earth formations, and to determine properties of a subsurface formation itself. Borehole NMR logging tools are sensitive to water and hydrocarbon content within a highly localized region of a subsurface formation near the tool. Borehole NMR logging tools may use prepolarization techniques to detect free induction decay (FID) NMR signals in the Earth's magnetic field, or may use permanent magnets, radiofrequency detection coils, and associated electronics to detect spin echo NMR signals in a localized region of the formation, e.g., generally within about 1 meter from the center of the borehole NMR logging tool.

One challenge with using NMR to detect heavy oils is that heavy oils typically exhibit very short T2 and T2* relaxation. Bitumen in Canadian oil sand samples for example, at room temperature, typically exhibit mean log T2 relaxation times of less than 3 milliseconds (ms). This inherently short transverse relaxation rate makes detection of heavy oils at room temperature difficult for surface NMR techniques, where the measurement "dead time" of the instrumentation is often in the range of 4 ms to 40 ms. The short T2 relaxation rates of bitumen at natural near surface formation temperatures also makes detection of cold bitumen difficult for borehole NMR logging tools, which typically have echo spacings on the order of 500 microseconds to 2.4 milliseconds. Furthermore, the typically short T2 relaxation of bitumen at natural near surface formation temperatures is similar to the relaxation signatures of clay bound water, and other irreducible forms of water in the subsurface.

When the temperature of a bitumen or other heavy oil sample is elevated or the sample is treated with solvents, e.g., pursuant to an induced alteration process, important changes occur. First, the viscosity of the heavy oil typically decreases. Also, the NMR relaxation rate T2 and the NMR-measured diffusion constant generally increase. Thus, heating a sample containing bitumen provides a means for extracting the bitumen from its soil/rock matrix, and may also allow for improving its detection and characterization via NMR measurements. Further, once heated bitumen is produced, the pore space previously occupied by hydrocarbon may be replaced or flushed by brine or water, which has different NMR characteristics including longer T2 and higher diffusion coefficient. By detecting the change in the NMR response during stimulation of a sample containing bitumen, water and rock matrix, it is possible to distinguish and characterize changes in the heavy oil and water components. This information may be used to optimize production strategies.

In some embodiments, methods according to this disclosure may therefore include, for example, determining a change in a subsurface formation or fluid during an induced alteration process, the change comprising one or more of a longer T2 NMR relaxation time and a higher fluid diffusion coefficient measured at a second time during the induced alteration process than measured at a first time during the induced alteration process, and further comprising correlating the determined change to an amount of pore space in a zone of the subsurface formation that has been flushed by water, steam, or brine. This information may be used to optimize production strategies, e.g., by discontinuing operation of a production well or a stimulation well in a zone wherein a majority of the pore space has been flushed.

NMR measurement techniques are described below for measuring and mapping the changes in heavy oil or contaminant deposits caused by injection of steam, solvents, chemicals or other engineered means of enhanced extraction of hydrocarbons that involve heating or chemically altering the oil deposit in-situ. Application of NMR measurement techniques to monitor and map changes in pore fluid properties within a formation subject to increased temperatures or chemical alteration results in information that can improve the efficiency and efficacy of heavy oil recovery operations.

In some embodiments, NMR measurements may be acquired using a non-invasive, surface-based apparatus. The surface-based NMR measurement may be performed using the Earth's magnetic field. One or more surface coil(s) and/or antenna(e) may be used to transmit pulsed electromagnetic fields to excite an NMR response from subsurface water or hydrocarbons and to detect the voltage induced by the NMR response. Surface NMR measurements may be conducted using a range of transmit pulse amplitudes, pulse sequences, and coil offsets to determine the spatial distribution of NMR signals. Various pulse sequences may be used to determine NMR relaxation times including T1, T2, and T2*. Naturally-occurring or engineered gradients in the static magnetic field may be utilized to improve the resolution of spatial distributions or heavy oil or water, and also to improve the resolution of diffusion properties of various pore fluids including heavy oil and water.

In some embodiments, NMR measurements may be acquired in one or more Earth boreholes in the vicinity of an altered extraction zone. Measurements may be acquired using a NMR measurement apparatus, such as a borehole NMR logging tool, which can be lowered down the borehole(s) to determine the NMR response of the surrounding subsurface Earth formation as a function of depth. Boreholes may be open, cased with non-conducting non-magnetic material, or sealed by an appropriate method such as cement or grout. Borehole NMR logging tools may be moved between borehole locations and depths or may be installed permanently or semi-permanently for repeated measurements. For example, in some embodiments, one or more borehole NMR measurement devices may be permanently installed in one or more backfilled boreholes in a subsurface formation to be measured. In some embodiments, an array of borehole NMR measurement devices may be deployed at multiple different positions within a subsurface formation.

Borehole NMR measurements may be repeated at one or more same locations over time in a monitoring approach to determine how the fluids and/or formation are changed by induced thermal or chemical alteration processes. In some embodiments, at least one borehole NMR measurement device may be deployed in-situ for a period longer than one day, and multiple borehole NMR measurements may be performed over the period longer than one day, e.g. by performing one or multiple measurements a day for multiple days, or measurements every few days, weeks, or months to determine fluid or formation changes over time during an induced alteration process.

NMR measurements may be configured to measure NMR relaxation times including T1, T2, and T2*, as well as to measure the diffusion coefficient of the fluids, as well as to detect any specific chemical solvents of interest in the extraction process. As described herein, some embodiments may comprise deploying surface as well as borehole NMR devices, and calibrating NMR signals as measured by surface NMR measurement devices using the borehole NMR measurements.

In some embodiments, NMR measurements may be used to determine how the formation or fluids are changed by the thermal or chemical alteration process, and how these changes will influence extraction processes. For example, measurements may indicate an increase in relaxation times as thermal or chemical alteration decreases the viscosity of the hydrocarbon. Increases in relaxation times may be manifest as an observed increase in the duration of the NMR signals or as an increase in the total detected NMR signal amplitude as very short signals below the timing detection threshold of the instrument become longer and so become detectable after alteration. Measurements may also indicate increases in the diffusion coefficient of the hydrocarbon and/or water as the fluids are heated or chemically altered. Measurements may also indicate spatial changes in the relative saturation of water, steam, and hydrocarbon as a result of steam assisted extraction, for example as hydrocarbons are flushed by steam. Further, changes in the spatial distribution of any of these above parameters may be determined in 1D, 2D, or 3D, and also as a function of time.

FIG. 1 illustrates an example embodiment in which a surface NMR apparatus is used to measure and monitor water and/or a hydrocarbon body during induced alteration processes in a configuration with horizontal stimulation and production wells. FIG. 1 includes ground surface 150 and a hydrocarbon reservoir body 100 at depth and including zones 101, 102, and 103. A horizontal production well 111 within hydrocarbon reservoir 100 is coupled with an oil extraction unit 110. A horizontal stimulation well 121 within hydrocarbon reservoir 100 is coupled with recovery stimulation unit 120, such as a steam or chemical injection unit. A surface NMR apparatus at ground surface 150 includes a power and control module 132 and a surface loop or antennae 133 which may be adapted to transmit pulsed electromagnetic fields 140 into hydrocarbon reservoir 100, thereby exciting an NMR response from hydrogen in the subsurface groundwater or hydrocarbon within reservoir 100. Power and control module 132 and surface loop or antennae 133 may furthermore be adapted to detect and record resulting NMR signals produced by NMR response of atomic nuclei in reservoir 100. In some embodiments, the surface NMR apparatus may be coupled with a noise reference loop 131 positioned to detect unwanted noise 160, allowing multi-channel measurement operations enabling mitigation of unwanted noise. Noise reference loop 131 may be positioned near an unwanted noise source to provide independent measurement of the noise 160 and enabling adaptive cancellation of the noise 160 from NMR responses measured using primary detection loop 133.

In FIG. 1, the area under surface 150 comprises a subsurface Earth formation, and the formation contains hydrocarbon reservoir body 100 at depth, including zones 101, 102, 103. Zones 101, 102, 103 may include unaltered zones, as well as altered zones in which the hydrocarbon reservoir 100 has been altered by induced alteration processes, as well as produced zones from which altered hydrocarbon has been extracted. One or more vertical or horizontal wells such as 120 may be used to inject steam or chemicals into the hydrocarbon reservoir 100 to reduce the viscosity of the hydrocarbons therein and to facilitate flow of hydrocarbons into one or more neighboring production wells 110.

Figure 2:
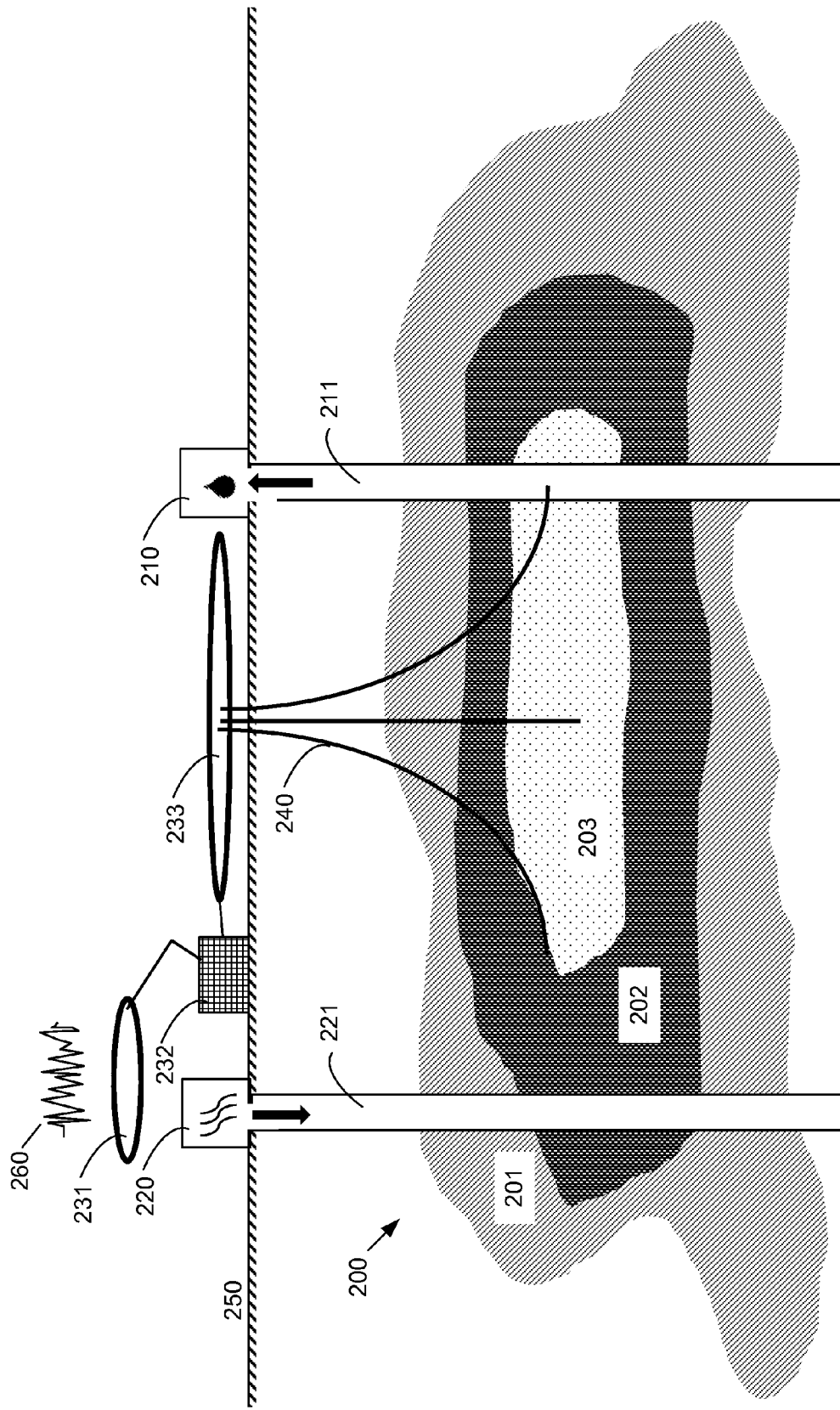
FIG. 2 illustrates an example embodiment in which a surface-based NMR apparatus is used to measure and monitor water and/or a hydrocarbon body during induced alteration processes in a configuration with vertical stimulation and production wells.

FIG. 2 illustrates an example embodiment in which a surface-based NMR apparatus is used to measure and monitor water and/or a hydrocarbon body during induced alteration processes in a configuration with vertical stimulation and production wells. FIG. 2 generally comprises elements similar to FIG. 1, wherein the elements may be adapted to accommodate a different reservoir 200 in a different subsurface formation, and differences resulting from the use of vertical stimulation and production wells, rather than horizontal wells as illustrated in FIG. 1. For example, the elements of FIG. 2 may be adjusted to accommodate different formation properties, different fluid types and composition, different fluid depths and geometries, different stimulation and production well geometries, and different noise signals from those of FIG. 1.

Like FIG. 1, FIG. 2 includes a ground surface 250 and a hydrocarbon reservoir body 200 at depth and including zones 201, 202, and 203. A horizontal production well 211 within hydrocarbon reservoir 200 is coupled with an oil extraction unit 210. A horizontal stimulation well 221 within hydrocarbon reservoir 200 is coupled with a recovery stimulation unit 220. A surface NMR apparatus at ground surface 250 includes a power and control module 232 and a surface loop or antennae 233 which may be adapted to transmit pulsed electromagnetic fields 240 into hydrocarbon reservoir 200, thereby exciting an NMR response from hydrogen in the subsurface groundwater or hydrocarbon within reservoir 200. Power and control module 232 and surface loop or antennae 233 may furthermore be adapted to detect and record resulting NMR signals produced by NMR response of atomic nuclei in reservoir 200. The surface NMR apparatus may be coupled with a noise reference loop 231 positioned to detect unwanted noise 260, allowing multi-channel measurement operations enabling mitigation of unwanted noise. Noise reference loop 231 may be positioned near an unwanted noise source to provide independent measurement of the noise 260 and enabling adaptive cancellation of the noise 260 from NMR responses measured using primary detection loop 233.

Figure 3:
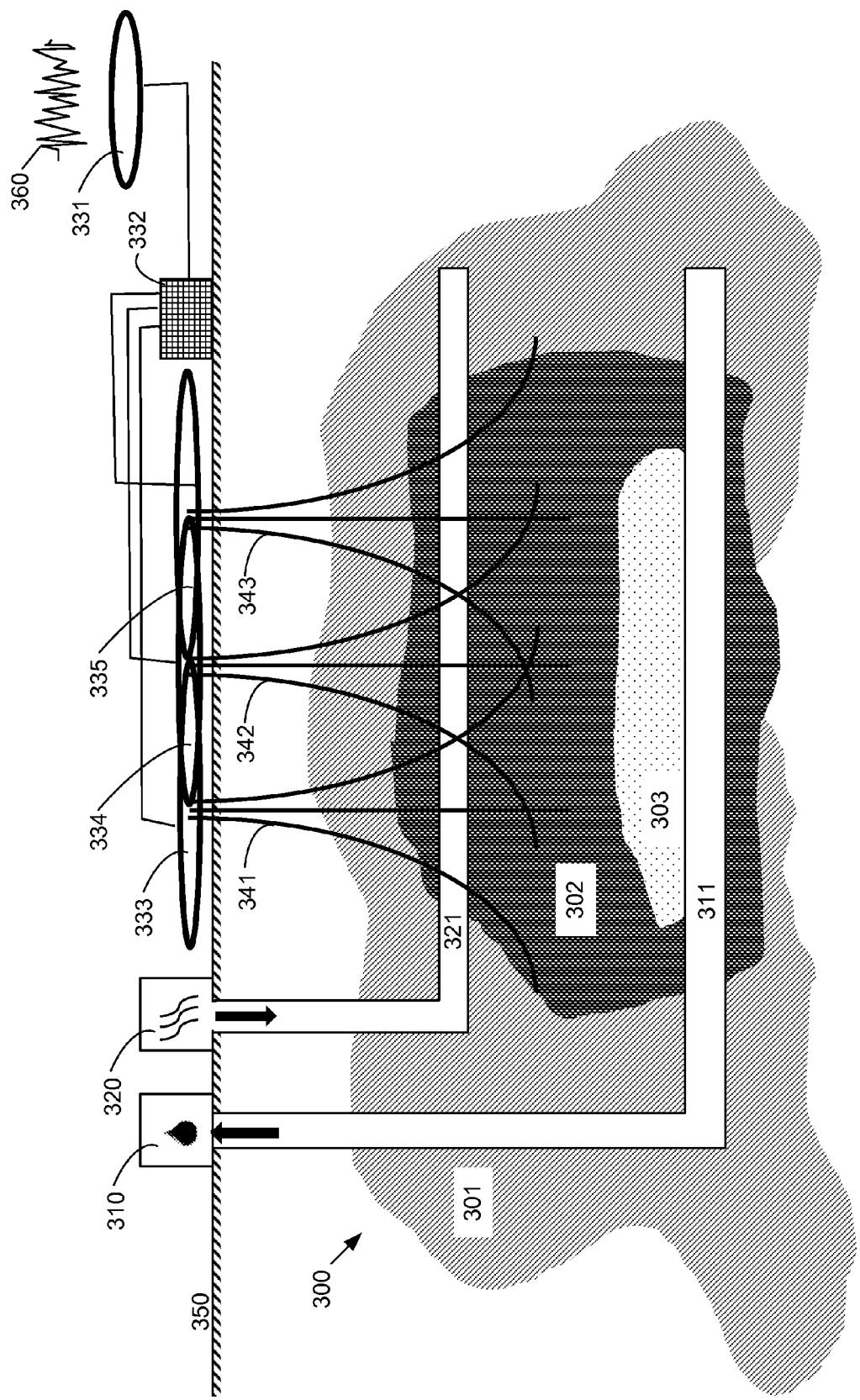
FIG. 3 illustrates an example embodiment in which a surface-based NMR apparatus and multiple measurement coils are deployed in a 2 or three dimensional configuration to measure and monitor 2 or 3 dimensional spatial variation of subsurface fluids during induced alteration processes.

FIG. 3 illustrates an example embodiment in which a surface-based NMR apparatus and multiple measurement coils are deployed in a 2 or three dimensional configuration to measure and monitor 2 or 3 dimensional spatial variation in subsurface fluids, such as water and/or hydrocarbon, during induced alteration processes. Like FIG. 1, FIG. 3 includes a ground surface 350 and a hydrocarbon reservoir body 300 at depth and including zones 301, 302, and 303. A horizontal production well 311 within hydrocarbon reservoir 300 is coupled with an oil extraction unit 310. A horizontal stimulation well 321 within hydrocarbon reservoir 300 is coupled with a recovery stimulation unit 320, such as a steam or chemical injection unit.

The surface NMR apparatus at ground surface 350 includes a power and control module 332 and multiple surface loops or antennae 333, 334, and 335, which may be adapted to transmit pulsed electromagnetic fields 341, 342, and 343 into hydrocarbon reservoir 300, thereby exciting an NMR response from hydrogen in the subsurface groundwater or hydrocarbon within reservoir 300. Power and control module 332 and surface loop or antennae 333, 334, and 335 may furthermore be adapted to detect and record resulting NMR signals produced by NMR response of atomic nuclei in reservoir 300. The surface NMR apparatus may be coupled with a noise reference loop 331 positioned to detect unwanted noise 360, allowing multi-channel measurement operations enabling mitigation of unwanted noise. Noise reference loop 331 may be positioned near an unwanted noise source to provide independent measurement of the noise 360 and enabling adaptive cancellation of the noise 360 from NMR responses measured using primary detection loops 333, 334, and 335.

FIG. 3 depicts and embodiment in which surface-based NMR instruments are used in a 2D or 3D configuration to measure and monitor changes in a subsurface Earth formation comprising the area below surface 350, and a hydrocarbon body 300 during induced thermal or chemical alteration. A surface-NMR apparatus including a plurality of surface loops or antennae 333, 334, and 335 are used to transmit pulsed electromagnetic fields 341, 342, and 343 exciting an NMR response from hydrogen in the subsurface groundwater or hydrocarbon within reservoir 300, and loops or antennae 333, 334, and 335 are also used to detect and record the resulting NMR signals.

Figure 4A:
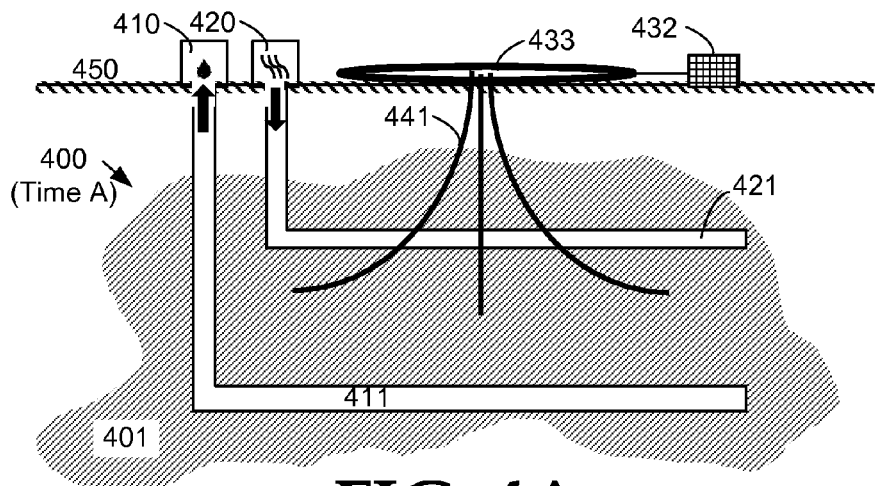
FIGS. 4A, 4B, and 4C illustrate an example embodiment and scenario in which surface-based NMR measurement reveals changes in formation and fluid properties during an induced alteration process.
Figure 4B:
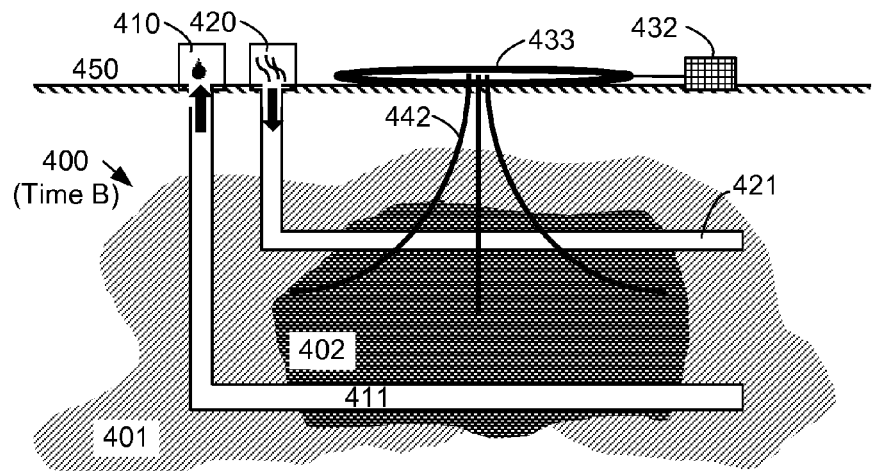
Figure 4C:
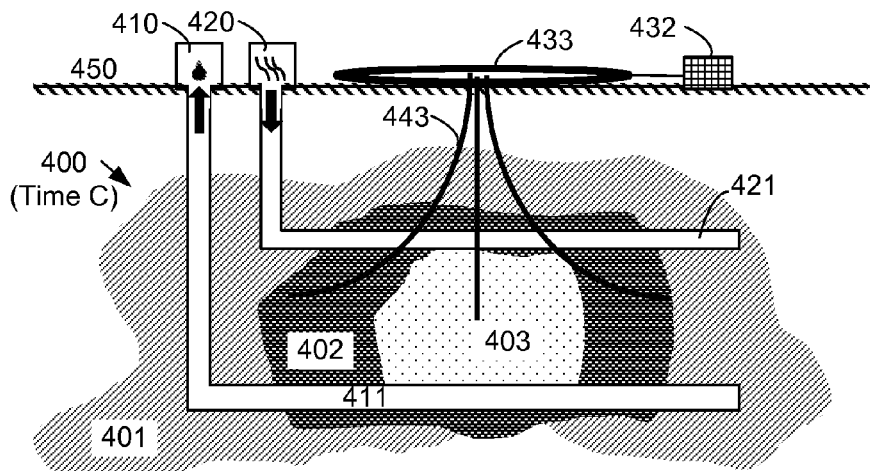

FIGS. 4A, 4B, and 4C illustrate an example embodiment and scenario in which surface-based NMR measurements reveal changes in formation and fluid properties during an induced alteration process. Like FIG. 1, FIG. 4 includes a ground surface 450 and a hydrocarbon reservoir body 400 at depth and including zone 401 at Time A, illustrated in FIG. 4A; zones 401 and 402 at Time B, illustrated in FIG. 4B; and zones 401, 402, and 403 at Time C, illustrated in FIG. 4C. A horizontal production well 411 within hydrocarbon reservoir 400 is coupled with an oil extraction unit 410. A horizontal stimulation well 421 within hydrocarbon reservoir 400 is coupled with a recovery stimulation unit 420. A surface NMR apparatus at ground surface 450 includes a power and control module 432 and a surface loop or antennae 433 which may be adapted to transmit pulsed electromagnetic fields 441, 442, and 443 into hydrocarbon reservoir 400, thereby exciting an NMR response from hydrogen in the subsurface groundwater or hydrocarbon within reservoir 400. Power and control module 432 and surface loop or antennae 433 may furthermore be adapted to detect and record resulting NMR signals produced by NMR response of atomic nuclei in reservoir 400. The surface NMR apparatus may be coupled with a noise reference loop, or may comprise a multicoil type apparatus as illustrated in FIG. 3 as will be appreciated.

FIG. 4 depicts an embodiment in which surface-based NMR measurements are performed at multiple points in time during the stimulation process of a heavy oil reservoir. Time A may represent a time prior to, or during an initial stage of a thermal, chemical, or other induced alteration or stimulation process. In the state at Time A, cold heavy oil in reservoir 400 is likely to exhibit too short of T2 or T2* for NMR signals to be detected. At a later Time B, e.g., a time during a subsequent stage of the induced alteration process, a portion of the heavy oil in the reservoir 400, e.g., the portion in zone 402, has been altered by stimulation such that the viscosity in zone 402 is reduced. At time B the relaxation times T2 and/or T2* of the altered zone 402 may be long enough to be detected and the reservoir 400 may be imaged and characterized based on the NMR response. At an even later Time C, a portion of the altered heavy oil has been drained and produced from the reservoir. At time C, e.g., a time during a further subsequent stage (after Time B) of the induced alteration process or after the induced alteration process is complete, the produced zone 402 may be flushed within zone 403 by steam or water. Water would be expected to exhibit relatively longer T2 and comparatively high signal amplitude compared to hydrocarbons, while steam would produce a smaller amplitude signal compared to hydrocarbons. These changes may be ascertained by methods provided herein, and used to evaluate and quantify changes in reservoir 400. Additional steps such as modifications of wells 412 and 420 may also be appropriate in some embodiments. It will be appreciated from FIG. 4 that NMR monitoring measurements provided herein may be used to determine parameters of altered fluids during production as well as to continually image and characterize the complete induced alteration process.

Information obtained from NMR measurements may be used in various ways to optimize the induced alteration process. For example, NMR measurements may reveal the viscosity of the oil in reservoir 400 has been reduced in a zone not currently exploited by a production well, suggesting such a zone may be advantageous to install a new production well more closely positioned in the altered zone or to install a new stimulation well that may better produce alteration close to existing production wells. In another example, NMR measurements may indicate, e.g., after substantial production, that a majority of pore space in the formation comprising reservoir 400 or a zone thereof, e.g., zone 403, has been flushed by steam or brine, suggesting to engineers that such zone 403 may be no longer viable for continued production.

Figure 5:
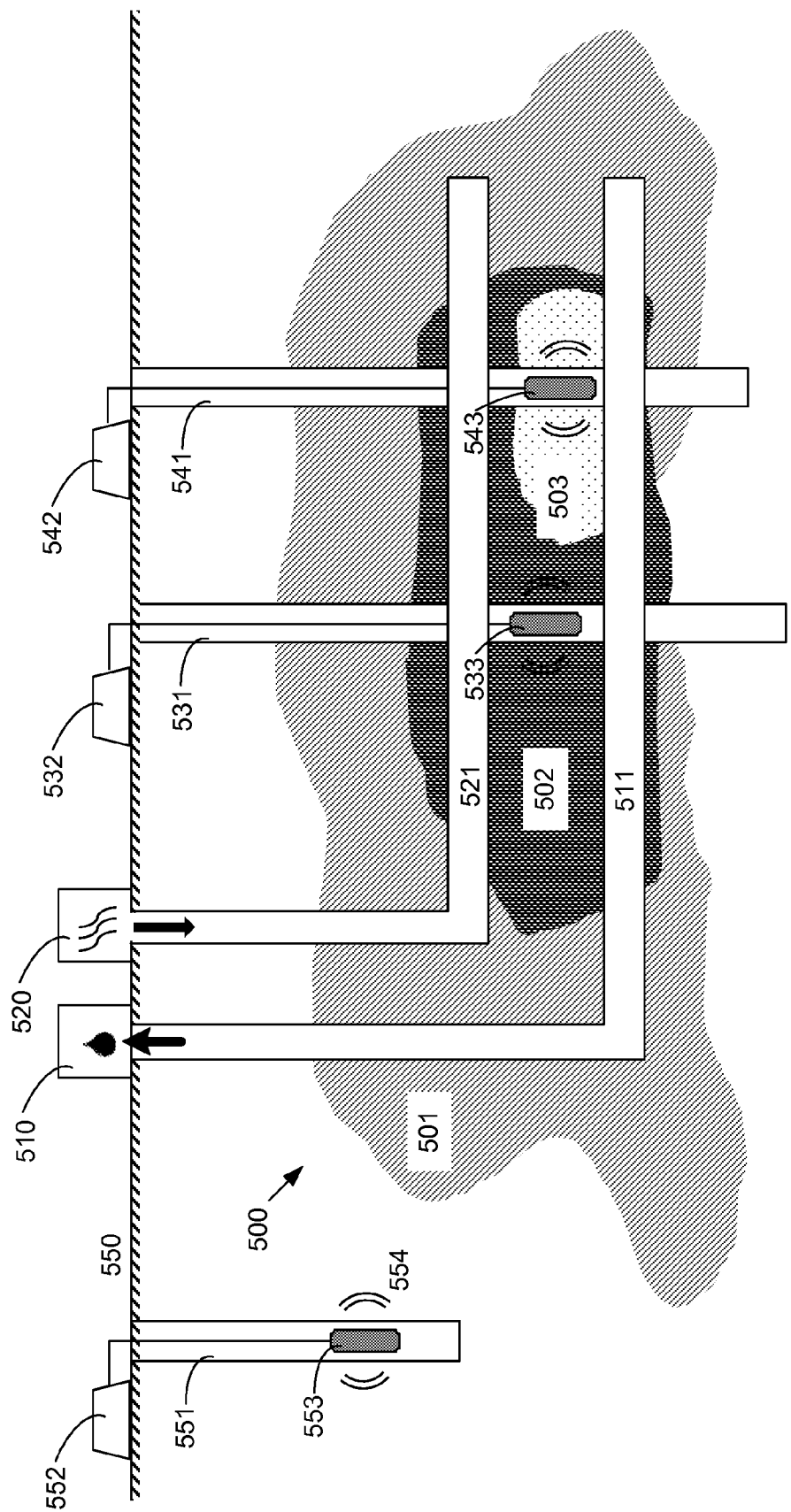
FIG. 5 illustrates an example embodiment in which borehole NMR probes are deployed in boreholes or wells to measure and monitor water and/or a hydrocarbon body during induced alteration processes.

FIG. 5 illustrates an example embodiment in which borehole NMR probes are deployed in boreholes or wells to measure and monitor water and/or a hydrocarbon body during induced alteration processes. Like FIG. 1, FIG. 5 includes a ground surface 550 and a hydrocarbon reservoir body 500 at depth and including zones 501, 502, and 503. A horizontal production well 511 within hydrocarbon reservoir 500 is coupled with an oil extraction unit 510. A horizontal stimulation well 521 within hydrocarbon reservoir 500 is coupled with a recovery stimulation unit 520.

In FIG. 5, one or more monitoring wells 531, 541, and 551 or boreholes are installed within and/or nearby the formation including reservoir 500 in which an induced alteration process is to occur. NMR logging sensors 533, 543, 553 are deployed in the monitoring wells 531, 541, and 551, to provide measurements of the NMR response of water, hydrocarbons, or other fluids in the sensor sensitive zones such as 554 within the formation. The NMR logging sensors 533, 543, 553 may be connected to power and control electronics 532, 542, and 552 at the surface 550.

In some embodiments, a borehole such as 551 or NMR logging tool 553 deployed therein may be modified to produce localized heating of a subsurface formation within the NMR sensitive region 554 of the borehole logging tool 553. This localized heating may be accomplished by one of several means that may be restricted to borehole 553, including the use of microwave energy to cause localized heating in the formation, and the use of relatively hot or cold mud of other fluids within the borehole 551 to cause temporary changes in the temperature in the immediate vicinity of the borehole 551. The resulting borehole NMR measurements may be used to directly measure the abundance and viscosity of heavy oil within the adjacent formation, to distinguish between the heavy oil and water components, and to determine the porosity of the adjacent formation.

Figure 6:
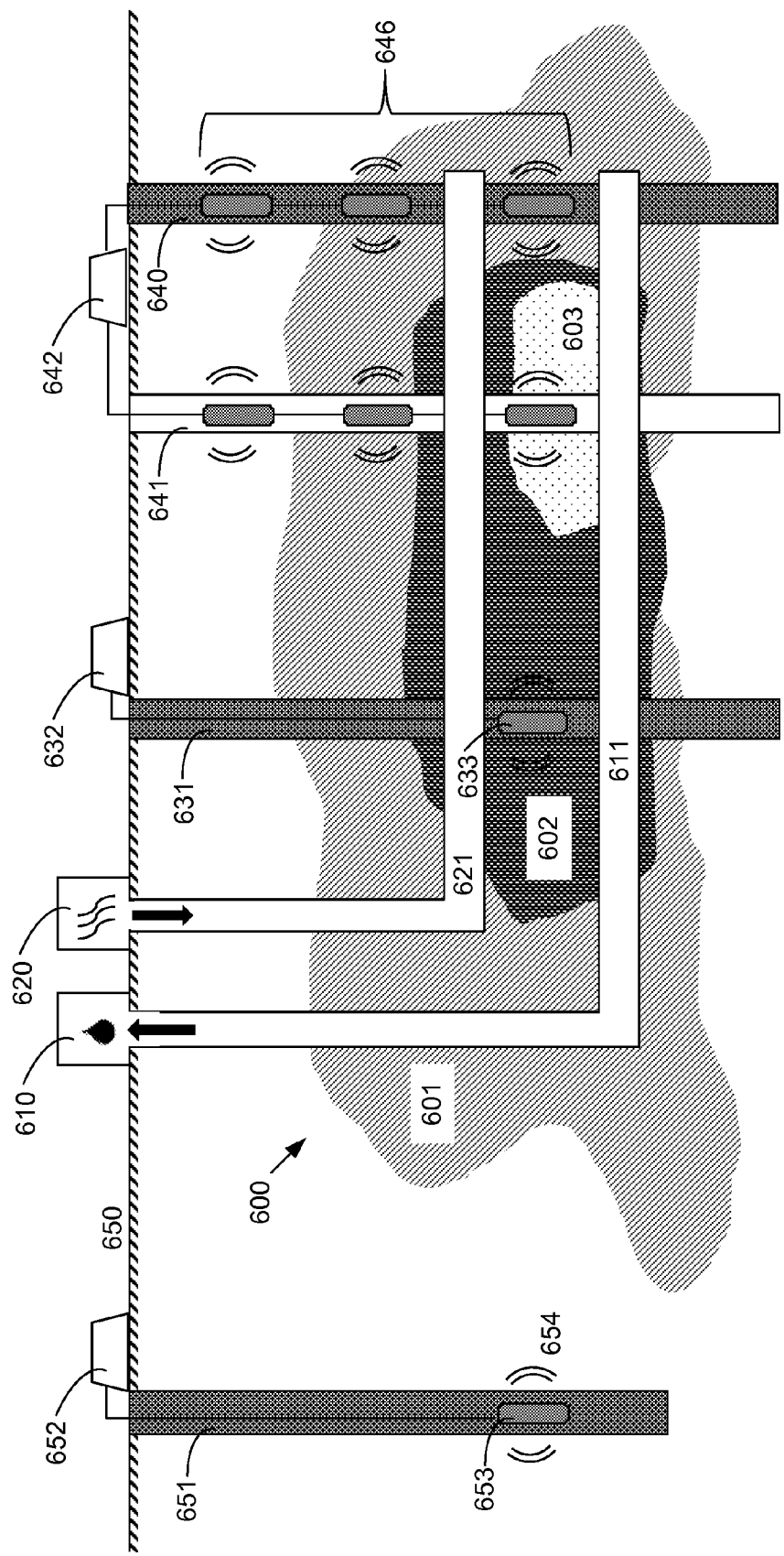
FIG. 6 illustrates example embodiments in which borehole NMR probes are buried or cemented in a formation, and in which multiple NMR probes may be deployed in an array within a single borehole, well, or enclosure to measure and monitor formation and fluid properties during induced alteration processes.

FIG. 6 illustrates example embodiments in which borehole NMR probes are buried or cemented in a formation, and in which multiple NMR probes may be deployed in an array within a single borehole, well, or enclosure to measure and monitor formation and fluid properties during induced alteration processes. Like FIG. 5. FIG. 6 includes a ground surface 650 and a hydrocarbon reservoir body 600 at depth and including zones 601, 602, and 603. A horizontal production well 611 within hydrocarbon reservoir 600 is coupled with an oil extraction unit 610. A horizontal stimulation well 621 within hydrocarbon reservoir 600 is coupled with a recovery stimulation unit 620. One or more monitoring wells 631, 640, 641, and 651 or boreholes are installed within and/or nearby the formation including reservoir 600 in which an induced alteration process is to occur. NMR logging sensors 633, 653, and the array of NMR logging sensors 646 are deployed in the monitoring wells 631, 640, 641, and 651, wherein the array of NMR logging sensors 646 may be deployed in multiple boreholes 640 and 641. As in FIG. 5, the various NMR logging sensors provide measurements of the NMR response of water, hydrocarbons, or other fluids in the sensor sensitive zones such as 654 within the formation. The NMR logging sensors 633, 653, and 646 may be connected to power and control electronics 632, 652, and 642, respectively, at the surface 650.

FIG. 6 depicts an embodiment in which permanently or semi-permanently installed borehole logging NMR sensors or NMR sensor arrays are used to measure and monitor changes in a subsurface Earth formation and hydrocarbon body 600 during induced thermal or chemical alteration. A single borehole sensor such as 633 or 653 may be permanently or semi-permanently installed in boreholes 631 and 651, respectively, which boreholes may be backfilled with a material such as bentonite or cement, as illustrated by the shaded boreholes 631, 651. Borehole 640, comprising an array of borehole sensors 646, may also be backfilled with a material such as bentonite or cement, while other boreholes, e.g., borehole 641, may remain unfilled to allow subsequent removal and/or changing positions of NMR sensors within borehole 641. It may be advantageous in some circumstances to permanently install the NMR sensor(s) by backfilling boreholes so that monitoring can occur over a long period of time (e.g. greater than one week). Further, most non-conductive non-magnetic casings required for NMR logging sensors, such as PVC, have limited tolerance to heat and solvents and so may not be suitable for long-term installation in a stimulated zone. Once permanently installed, a borehole probe such as 633 may not be easily moved to a different position or depth in the borehole 631. It may therefore be advantageous to deploy an array 646 of NMR sensors comprising more than one NMR sensor in a single borehole 640 and/or across multiple boreholes 640 and 641. The individual NMR sensors of the array 646 may be connected to individual control and power electronics or may be connected to a single control and power electronics unit 642 capable of operating a multitude of NMR sensors, as shown.

In some embodiments, surface NMR coils and borehole NMR sensors may be used concurrently and placed such that the sensitive zone for one or more surface coils overlaps the sensitive zone for one or more borehole NMR sensors. Such configurations provide an opportunity to correlate the NMR response measured by surface NMR instrumentation to the NMR response measured by the borehole NMR sensor and therefore to calibrate the NMR response as measured by one instrument with that of the other instrument. For example, a borehole sensor 633 may be used to develop a reservoir-specific correlation relationship between T2 and the diffusion coefficient of the fluid in reservoir 600 or a zone 602 thereof, as it is generally easier to measure the diffusion coefficient with a borehole NMR sensor, given the magnetic gradient of the measurement, than it is with a surface NMR device. Such a correlation relationship may then be used to estimate the diffusion coefficient from surface NMR measurements based on measurement of T2 or T2*, where the surface NMR measurements are performed with a surface device such as illustrated in FIGS. 1, 2, 3, and 4. As another example, a borehole logging tool may be used to determine the maximum relaxation time of the altered heavy oil, and the determined maximum relaxation time may then be used as a cutoff time for surface NMR measurements, to distinguish possible heavy oil signals from signals that may be too long to represent heavy oil.

In some example methods employing both surface and borehole measurement devices, one or more surface NMR devices may be deployed at the surface, along with one or more borehole NMR measurement devices within a subsurface formation. Borehole NMR measurements may be performed with the borehole NMR measurement devices, and the borehole NMR measurements may be used to calibrate NMR signals as measured by at least one surface NMR measurement device. In some embodiments, calibrating the NMR signals as measured by a surface NMR measurement device may comprise, e.g., using the one or more borehole NMR measurements to develop a correlation relationship between T2 and a diffusion coefficient of at least one type of fluid within the subsurface formation, and using the developed correlation relationship to estimate a diffusion coefficient from surface NMR measurements, based on surface NMR measurements of T2 or T2* of the at least one type of fluid. In some embodiments, calibrating the NMR signals as measured by a surface NMR measurement device may comprises using the one or more borehole NMR measurements to determine a maximum relaxation time of altered heavy oil in the subsurface formation, and using the determined maximum relaxation time as a cutoff time for one or more of the surface NMR measurements, to distinguish NMR signals representing heavy oil from NMR signals too long to represent heavy oil.

While some embodiments described above have been described in the context of oil extraction, it is appreciated that the ability to monitor changes in formation properties and fluid properties including hydrocarbons during induced alteration processes is of value for other applications, including those in which hydrocarbons are present as contamination in the near surface. Hydrocarbon liquids introduced to into the near surface as contaminants may be referred to as "non-aqueous phase liquids" (NAPLs) and are a widely occurring type of contamination. NAPLs may be unintentionally released into the subsurface through accidental leaks in underground storage tanks, from surface spills, or other means. NAPLs pose a significant health risk and zones of NAPL contamination are commonly monitored and treated to remove the contamination or to otherwise isolate the contamination from harming ecosystem and human health.

Numerous strategies exist for remediating NAPL contamination. The most direct strategy of excavating the contaminant can be extremely costly as large volumes of soil must be removed, treated, and disposed. Other strategies of installing trenches, drains, or extraction wells seek to physically remove the contaminant by induce the NAPL to flow into a conduit for removal.

A number of other strategies seek to remove or immobilize the NAPL by altering a chemical or physical state of the NAPL and/or a subsurface formation via one or more induced alteration processes. Some of these methods are directly analogous to those used in heavy oil EOR to improve the flow of hydrocarbon to a production or extraction well. For example, heat and solvents may be introduced in injection wells, to reduce the viscosity of the NAPL and to increase the vapor pressure of the fluid (both of which are associated with an increase in the fluid diffusion coefficient) so it can be more efficiently induced to flow into extraction wells. In methods referred to as "soil vapor extraction", contaminants may also be removed by cycling air or steam into a contaminated zone, and removing a portion of NAPL which volatilizes into extracted air or steam. Surfactants may also be introduced to alter the wetting state of the fluids in the formation, as differences in wettability of the water and NAPL phase may strongly influence the ability of NAPL to flow to an extraction well. Biological stimulation may also be used to alter a chemical state of a NAPL. For example, bacteria which consume the NAPL may be introduced or stimulated in a subsurface formation and can transform NAPL into other non-toxic or immobilized compounds. Therefore, it should be understood that the various teachings described herein apply to NMR monitoring during any induced alteration processes, including those applied for NAPL remediation as well as oil extraction.

In some embodiments NMR measurements may be conducted to monitor active remediation of NAPL contamination where the remediation involves inducing a thermal or chemical alteration of the NAPL. Various configurations of surface NMR sensors and/or surface coils may be used to monitor the NAPL remediation, including but not limited to those described in previous embodiments. NMR measurements may be used to determine and monitor properties including NMR parameters of NMR signal amplitude, relaxation time, fluid diffusion coefficient, and properties determined based on the NMR signal including porosity, pore size, permeability, fluid type, fluid volume fraction, fluid viscosity, and wettability. The information gained from the NMR measurement may further be used to optimize, change, or maintain a remediation strategy. Changes may include, for example, adding additional injection wells, relocated extraction wells, or increasing the temperature of injected steam.

Figure 7:
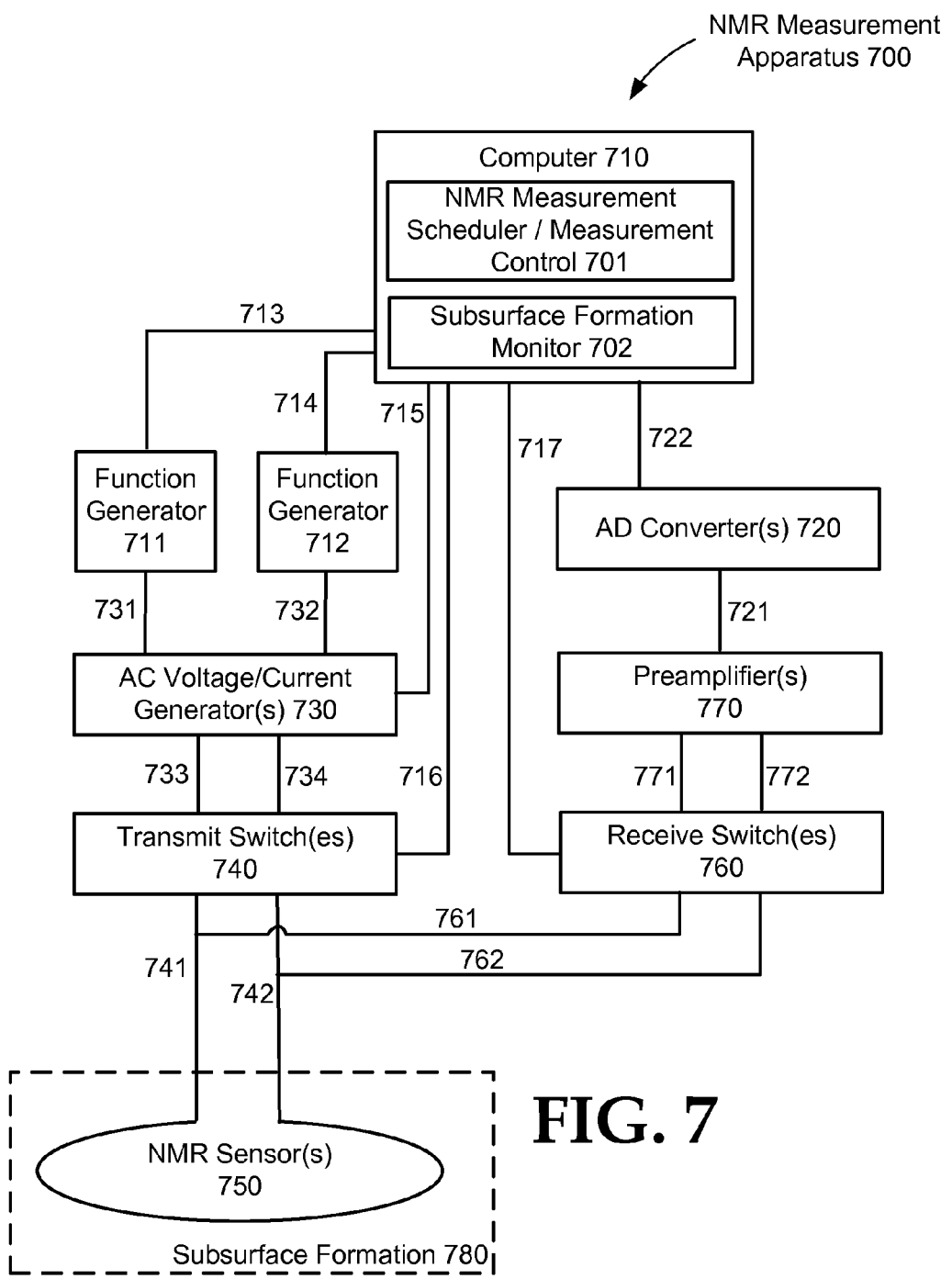
FIG. 7 illustrates an example NMR measurement apparatus.

FIG. 7 illustrates an example NMR measurement apparatus for use in connection with embodiments of this disclosure. The example NMR measurement apparatus 700 includes a computer 710, function generators 711, 712, AC voltage/current generator(s) 730, transmit switch(es) 740, NMR sensor(s) 750, receive switch(es) 760, preamplifier(s) 770, and Analog to Digital (AD) converter(s) 720. The NMR sensor(s) 750 are illustrated as an induction coil over a subsurface formation 780. Computer 710 comprises NMR measurement scheduler/measurement control module(s) 701 and subsurface formation monitor module(s) 702.

In FIG. 7, the computer 710 is coupled to function generators 711, 712 by connections 713 and 714, respectively. The computer 710 is also coupled to AC voltage/current generator(s) 730 by connection 715, to transmit switch(es) 740 by connection 716, to receive switch(es) 760 by connection 717, and to AD converter(s) 720 by connection 722. Furthermore, function generators 711, 712 are coupled to AC voltage/current generator(s) 730 by connections 731 and 732, respectively. AC voltage/current generator(s) 730 are coupled to transmit switch(es) 740 by connections 733 and 734. Transmit switch(es) 740 are coupled to both ends 741 and 742 of the induction coil implementing NMR sensor(s) 750. The ends of the induction coil(s) 741 and 742 are coupled to receive switch(es) 760 by connections 761 and 762, respectively. Receive switch(es) 760 are coupled to preamplifier(s) 770 by connections 771 and 772. Preamplifier(s) 770 are coupled to AD converter(s) 720 by connection 721.

In general, with regard to FIG. 7, NMR measurement scheduler/measurement control module(s) 701 may be configured to schedule and perform NMR measurements with the various other illustrated components of the NMR measurement apparatus 700. For example, with regard to performing NMR measurements, the various components may be operated to produce current pulses on the NMR sensor(s) 750, to thereby create NMR excitation pulses in the subsurface formation 780. The computer 710 may be configured to produce a pulse by selecting a pulse phase, and activating the AC voltage/current generator(s) 730. The computer 710 may be configured to select a pulse phase for example by activating a function generator 711 or 712 corresponding to a desired pulse phase, so that the selected function generator 711 or 712 provides an input pulse phase to the AC voltage/current generator(s) 730, which is then amplified by the AC voltage/current generator(s) 730 to produce a corresponding pulse on the NMR Sensor(s) 750. The computer 710 may also optionally be configured to close one or more transmit switch(es) 740 when activating the AC voltage/current generator(s) 730, and open the transmit switch(es) 740 after activating the AC voltage/current generator(s) 730.

NMR measurement apparatus 700 may also be configured to receive and record NMR signal data received via the NMR sensor(s) 750. NMR measurement apparatus 700 may be configured to receive and record NMR signal data after one or more excitation pulses. In some embodiments, the computer 710 may be configured to close the receive switch(es) 760 after a pulse. The preamplifier(s) 770 amplify NMR signals received via induction coil(s) 750. The AD converter(s) 720 convert the received and amplified signals to digital NMR signal data, e.g. by sampling received NMR signals at a desired sampling rate, and the computer 710 or other device equipped with storage media may be configured to store the resulting digital NMR signal data.

With regard to scheduling NMR measurements, computer 710 may comprise an NMR measurement control apparatus comprising an NMR measurement scheduler adapted to perform two or more NMR measurements with an NMR measurement device such as apparatus 700, wherein at least one first NMR measurement of said two or more NMR measurements is performed at a first time before or during an induced alteration process applied to the subsurface formation 780, and wherein at least one second NMR measurement of said two or more NMR measurements is performed at a second time during or after an induced alteration process applied to the subsurface formation 780, and wherein the NMR measurement scheduling device 710 is adapted to schedule the two or more NMR measurements according to a rate or stage of the induced alteration process. For example, computer 710 may be adapted to receive human operator input data regarding rate or stage of the induced alteration process, or to receive automated data from apparatus communicatively coupled to apparatus that controls or monitors wells such as 110 and 120. Computer 710 may be adapted to schedule NMR measurements based on a rate at which induced alteration processes are applied or based on sensor data indicated a rate at which induced alteration processes are progressing. For example, computer 710 may be adapted to apply more frequent NMR monitoring measurements with apparatus 700 in response to more rapid induced alteration processes, and vice versa.

In some embodiments, the subsurface formation monitor 702 may be configured to process NMR measurement data from subsurface formation 780, generated by operation of the measurement control module 701 according to scheduled measurements, along with the various other components of NMR measurement apparatus 700. Subsurface formation monitor 702 may be configured to use measured NMR properties to determine and/or facilitate determination of any of a variety of properties described herein. It will be appreciated that while the computer 710 may be configured to include subsurface formation monitor 702, in some embodiments NMR measurements and determination of subsurface formation and fluid properties may be performed separately, e.g., by first performing measurements with system 700, then processing acquired NMR data at a later time and/or with a different computing device or by a human operator.

It will be appreciated that NMR measurement apparatus may be configured differently than illustrated in FIG. 7 in some embodiments. NMR sensors 750 may comprise borehole sensors, along with various other modifications to apparatus 700, to implement a borehole NMR measurement device. To recite just a few of the many other possible configuration options, computer 710 may be programmed with software that controls the generation of pulse sequences and the acquisition of data. A set of data acquisition devices may comprise devices configured generate the control signals for the pulse sequences, such as function generators 711, 712, and AD converter(s) 720 that receive, convert and/or record NMR signals. The AC voltage/current generator(s) 730 may be configured to generate one or more current pulses in the induction coil(s) 750 in a transmit mode, to induce a coherent precession of NMR spins in fluid content in the subsurface formation 780. Optional transmit switch(es) 740 may be configured to isolate transmitter noise from the receive circuitry during a receive mode. NMR sensor(s) 750 may be arranged other than as induction coils, and may be configured in a variety of ways as described herein or as known or as may be developed in the art. Optional receive switch(es) 760 may be configured to isolate the receive preamplifier(s) 770 from the potentially large voltage on the NMR sensor(s) 750 during transmit mode. Optional preamplifier(s) 770 may be configured to amplify the detected NMR signals prior to digitization by the AD converter(s) 720. The optional transmit switch(es) 740 and receive switch(es) 760 may comprise active devices such as relays, and/or passive devices such as diodes. Optional tuning capacitors, not shown in FIG. 7, may be used in the transmit mode to increase the transmitted current in the induction coil(s) 750, and/or in receive mode to increase the amplitude of the NMR signal voltage across the terminals of the induction coil(s) 750.

In some embodiments, NMR sensor(s) 750 may comprise an array of coils comprising one or more transmit coils, one or more receive coils, and/or one or more combination transmit and receive coils. For example, NMR sensor(s) 750 may comprise one transmit coil and multiple receive coils. NMR sensor(s) 750 may comprise one combination transmit and receive coil, and multiple receive coils. NMR sensor(s) 750 may comprise multiple combination transmit and receive coils. These and other multicoil arrangements may be configured in some embodiments as will be appreciated. Multicoil arrangements are useful for localization of fluids in subsurface formation 780, as described for example in U.S. Pat. No. 7,466,128, entitled "Multicoil Data Acquisition and Processing Methods," issued Dec. 16, 2008, which is incorporated by reference herein.

Any combination of hardware and software that enables the acquisition and processing of NMR signals is suitable to implement embodiments of this disclosure. An architecture to implement the disclosed methods could comprise, for example, elements illustrated in FIG. 7, such as an AC voltage and current generator 730, a digital control system implemented at least in part by computer 710, a transmit switching circuit including transmit switch(es) 740, a receive switching circuit including receive switch(es) 760, a multi-channel receive circuit including, e.g., a plurality of induction coils in NMR sensor(s) 750, preamplifier(s) 770, a digital acquisition system including AD converter(s) 720, a digital storage device which may be implemented within computer 710 or other digital storage device, and a digital computer 710 equipped with NMR measurement scheduling, NMR measurement control, and/or subsurface formation monitoring software. The switching circuits may transition a system such as 700 between a transmit-mode, when the coil(s) 750 are connected to the transmit circuit, and receive-mode when the coil(s) 750 are connected to the receive circuit.

In general, NMR measurements may be collected by transmitting one or more pulses of alternating current through NMR sensor(s) 750. The alternating current may be tuned to the Larmor frequency of hydrogen nuclei, for example, and may generate a magnetic field in the subsurface formation 780 alternating at the Larmor frequency. The alternating magnetic field radiates into the subsurface formation 780 and modifies the nuclear magnetization state of hydrogen atoms present in fluids in subsurface formation 780. The transmitted alternating magnetic field perturbs the magnetization from equilibrium alignment in a static magnetic field, so that some component of the nuclear magnetization rotates into the transverse "xy" plane. Once rotated from equilibrium, the magnetization relaxes over time back to the equilibrium state over time, decaying from the transverse plane and re-growing along the longitudinal axis. The rotation of the magnetization by the transmitted pulse(s) and subsequent relaxation to equilibrium are described by the phenomenological Bloch equations. The evolution of the magnetization under the Bloch equations depends on several variables including the amplitude of the transmitted field, the duration and timing of the transmitted field, the phase of the transmitted field, the longitudinal relaxation time T1, FID relaxation rate T2*, and/or the spin-spin relaxation time T2 of the hydrogen nuclei under investigation. These aspects of NMR measurement may be used in determining the various NMR properties described herein.

Figure 8:
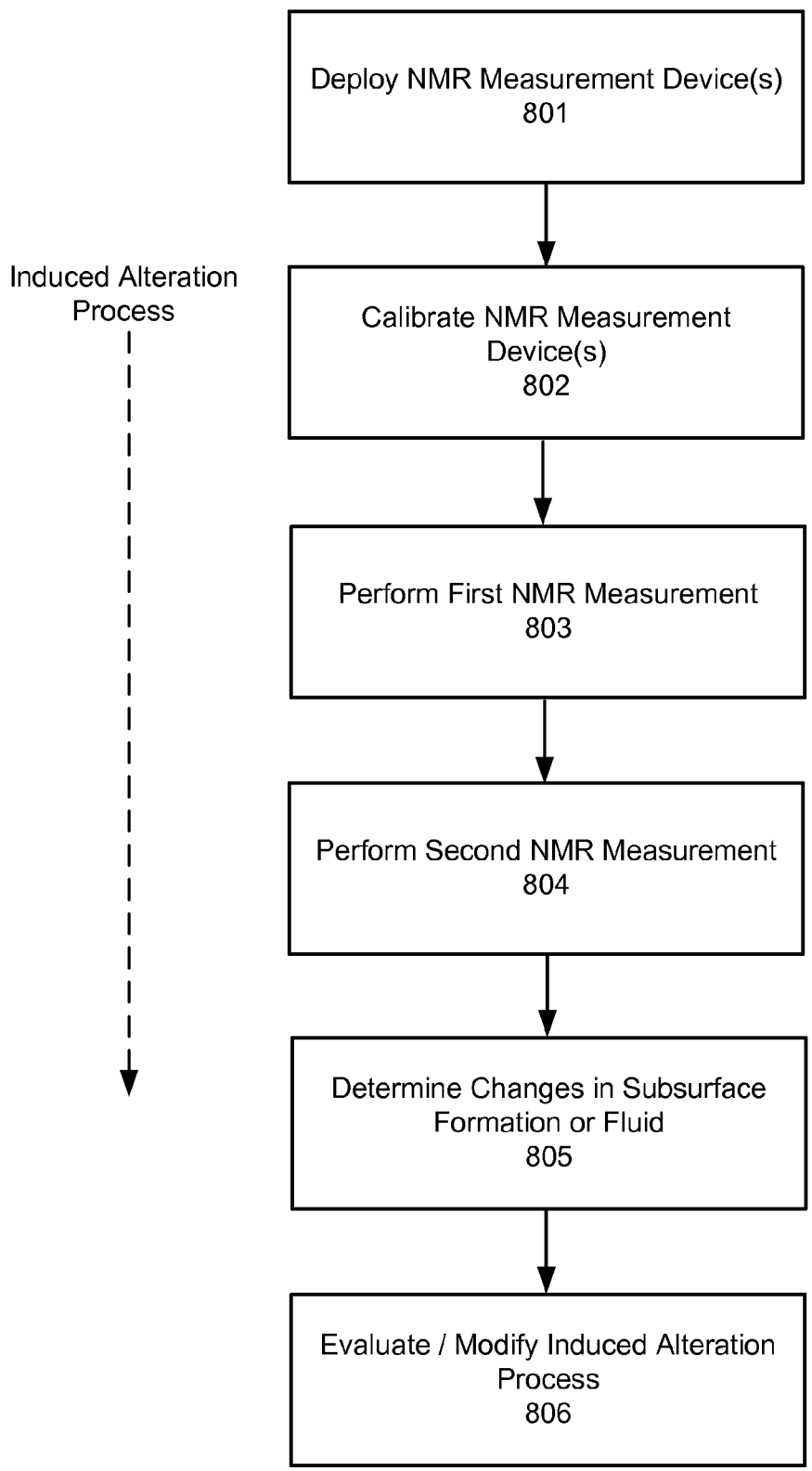
FIG. 8 illustrates example methods for monitoring, via NMR measurements, properties of subsurface fluids within a subsurface formation during induced alteration processes.

FIG. 8 illustrates example methods for monitoring, via NMR measurements, properties of subsurface fluids within a subsurface formation during induced alteration processes. The flow diagram includes operations/modules as illustrated by blocks 801-806, which represent operations as may be performed in a method, functional modules in a computing device 710, and/or instructions as may be recorded on a computer readable medium executable by computing device 710.

In FIG. 8, blocks 801-806 are illustrated as being performed sequentially, e.g., with block 801 first and block 806 last. It will be appreciated however that these blocks may be re-arranged as convenient to suit particular embodiments and that these blocks or portions thereof may be performed concurrently in some embodiments. It will also be appreciated that in some examples various blocks may be eliminated, divided into additional blocks, and/or combined with other blocks.

At a "Deploy NMR Measurement Devices" block 801, one or more surface and/or borehole NMR measurement devices may be deployed near the surface of the Earth, or within boreholes in a subsurface formation that contains hydrocarbons.

At a "Calibrate NMR Measurement Devices" block 802, NMR measurement devices maybe calibrated by a variety of techniques including, inter alia, calibrating surface NMR devices using measurements performed with borehole NMR devices, and vice versa. For example, an initial set of NMR measurements may be performed with borehole and surface NMR devices. NMR signals as measured by at least one surface NMR measurement device may be calibrated using borehole NMR measurements. Borehole measurements may be used to develop a correlation relationship between T2 and a diffusion coefficient of at least one type of fluid within the subsurface formation. Subsequent measurements with the surface NMR device may use the developed correlation relationship to estimate a diffusion coefficient from surface NMR measurements, based on surface NMR measurements of T2 or T2* of the at least one type of fluid. Similarly, borehole NMR measurements may be used to determine a maximum relaxation time of altered heavy oil in the subsurface formation, and subsequent measurements with the surface NMR device may use the determined maximum relaxation time as a cutoff time for one or more of the surface NMR measurements, to distinguish NMR signals representing heavy oil from NMR signals too long to represent heavy oil.

At a "Perform First Measurement" block 803, a first of two or more surface NMR measurements may be performed with deployed NMR measurement devices, wherein at least one first NMR measurement of said two or more NMR measurements is performed at a first time before or during an induced alteration process applied to the subsurface formation. The induced alteration process progresses as the method of FIG. 8 is performed, as illustrated to the left of the operational blocks.

At a "Perform Second Measurement" block 804, a second of two or more surface NMR measurements may be performed with deployed NMR measurement devices, wherein the at least one second surface NMR measurement of said two or more surface NMR measurements is performed at a second time during or after an induced alteration process applied to the subsurface formation. For example, block 804 is performed at a later time during the induced alteration process illustrated at left.

Each of blocks 803 and 804 may comprise detecting NMR signals from one or more types of underground pore fluids within the subsurface formation, e.g., signals from water or steam, brine, etc., and signals from hydrocarbons. In some embodiments, each of blocks 803 and 804 may furthermore comprise analyzing the NMR signals for each of the two or more NMR measurements to determine properties of the subsurface formation or fluid, such as NMR signal amplitude, NMR relaxation times, NMR relaxation time distribution, formation porosity, formation permeability, fluid type, fluid volume fraction, hydrocarbon saturation, fluid diffusion coefficient, fluid viscosity, and formation wetting state. In some embodiments, analysis may be performed separately from blocks 803 and 804, e.g. at a later time after both blocks 803 and 804 are completed.

At a "Determine Changes in Subsurface Formation or Fluid" block 805, changes may be determined between at least one property of the subsurface formation or fluid at the time of the NMR measurement at block 803 and the NMR measurement at block 804. A variety of relevant changes may be usefully determined at block 805 as described herein. For example, the two or more surface NMR measurements may be performed in a one, two, or three dimensional configuration to determine the spatial variation of the subsurface formation and fluid properties in two or three dimensions, and the determined change may comprise a spatial change in relative saturation of water, steam, and hydrocarbon as a result of the induced alteration process. In some embodiments, the determined change may comprise a viscosity reduction of hydrocarbons in a zone within the subsurface formation. In some embodiments, the determined change may comprise one or more of a longer T2 NMR relaxation time and a higher fluid diffusion coefficient measured at the second time than measured at the first time, where such a determined change may be correlated to an amount of pore space in a zone of the subsurface formation that has been flushed by water, steam, or brine.

Any of a variety of operations may be performed or influenced by the outcome of block 806. In some embodiments, determined changes in properties of the subsurface formation or fluid may be used to evaluate effectiveness of the induced alteration process. In some embodiments, a production well or a stimulation well may be installed in a zone of reduced viscosity hydrocarbons within the subsurface formation. In some embodiments, operation of a production well or a stimulation well may be discontinued in a zone wherein a majority of the pore space has been flushed.

It will be appreciated from this disclosure that methods according to FIG. 8 may be applied in the context of any induced alteration processes, where processes for extracting hydrocarbons from subsurface formations, such as enhanced oil recovery process for extraction of native heavy oil, and contaminant remediation processes for removing non-native hydrocarbons present as contamination subsurface formations are provided as example induced alteration processes. Furthermore, induced alteration process may comprise thermal alteration processes such as heating subsurface formations and/or injecting steam into subsurface formations, chemical alteration process such as injecting a chemical solvent into a subsurface formation, and alteration processes such as injecting a biological agent into a subsurface formation.

There is little distinction left between hardware and software implementations of aspects of systems; the use of hardware or software is generally (but not always) a design choice representing cost vs. efficiency tradeoffs. There are various vehicles by which processes and/or systems and/or other technologies described herein can be effected (e.g., hardware, software, and/or firmware), and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be within the skill of one skilled in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically coupling and/or physically interacting components and/or wirelessly interacting components and/or logically interacting components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various embodiments have been disclosed herein, other aspects and embodiments will be apparent to those skilled in art.

The invention claimed is:

1. A method for monitoring, via NMR measurements, properties of subsurface fluids within a subsurface formation, comprising:
    deploying one or more surface NMR measurement devices near an Earth surface and proximal to a subsurface formation that contains hydrocarbons, wherein the one or more surface NMR measurement devices are adapted to use Earth's magnetic field as a background magnetic field for surface NMR measurements, and wherein the one or more surface NMR measurement devices comprise one or more surface loops or antennae arranged non-invasively near the Earth surface;
    performing two or more surface NMR measurements with said one or more surface NMR measurement devices, wherein at least one first surface NMR measurement of said two or more surface NMR measurements is performed at a first time before or during an induced alteration process applied to the subsurface formation, and wherein at least one second surface NMR measurement of said two or more surface NMR measurements is performed at a second time during or after the induced alteration process applied to the subsurface formation;
    detecting, for each of the two or more surface NMR measurements, NMR signals from one or more types of underground pore fluids within said subsurface formation;
    analyzing the NMR signals for each of the two or more surface NMR measurements to determine, for each of the two or more surface NMR measurements, one or more properties of the subsurface formation or fluid, wherein the one or more properties comprise at least one property selected from the group comprising: NMR signal amplitude, NMR relaxation times, NMR relaxation time distribution, formation porosity, formation permeability, fluid type, fluid volume fraction, hydrocarbon saturation, fluid diffusion coefficient, fluid viscosity, and formation wetting state; and
    determining a change in at least one property of the subsurface formation or fluid between the at least one first surface NMR measurement at the first time before or during the induced alteration process applied to the subsurface formation, and the at least one second surface NMR measurement performed at a second time during or after the induced alteration process applied to the subsurface formation.

2. The method of claim 1 wherein the induced alteration process comprises a thermal alteration process, the thermal alteration process comprising one or more of heating the subsurface formation, injecting steam into the subsurface formation, or inducing combustion of a portion of the formation.

3. The method of claim 1 wherein the induced alteration process comprises a chemical alteration process, the chemical alteration process comprising injecting a chemical solvent into the subsurface formation as a liquid or gas phase.

4. The method of claim 1 wherein the induced alteration process comprises injecting a biological agent into the subsurface formation, wherein the biological agent is adapted to cause a chemical alteration, through metabolic bacterial processes, of at least one type of underground pore fluid in the subsurface formation.

5. The method of claim 1 wherein the two or more surface NMR measurements are performed in a one, two, or three dimensional configuration to determine the spatial variation of the subsurface formation and fluid properties in two or three dimensions.

6. The method of claim 1 further comprising using the determined change in at least one property of the subsurface formation or fluid to evaluate effectiveness of the induced alteration process.

7. The method of claim 1 wherein the determined change comprises a viscosity reduction of hydrocarbons in a zone within the subsurface formation.

8. The method of claim 7, further comprising installing a production well or a stimulation well in the zone of reduced viscosity hydrocarbons within the subsurface formation.

9. The method of claim 1 wherein the determined change comprises one or more of a longer T2 NMR relaxation time component and a higher fluid diffusion coefficient measured at the second time than measured at the first time, and further comprising correlating the determined change to an amount of pore space in a zone of the subsurface formation that has been flushed by water, steam, or brine.

10. The method of claim 9, further comprising discontinuing operation of a production well or a stimulation well in a zone wherein a majority of the pore space has been flushed.

11. The method of claim 1 wherein the determined change comprises a spatial change in relative saturation of water, steam, and hydrocarbon as a result of an induced alteration process comprising steam assisted extraction.

12. The method of claim 1 wherein the induced alteration process comprises at least a portion of a process for extracting the hydrocarbons from the subsurface formation.

13. The method of claim 12 wherein the hydrocarbons comprise native heavy oil and wherein the induced alteration process comprises an enhanced oil recovery process.

14. The method of claim 1 wherein the hydrocarbons comprise non-native hydrocarbons present as contamination the subsurface formation, and wherein the induced alteration process comprises at least a portion of a contaminant remediation process.

15. The method of claim 1, further comprising:
deploying one or more borehole NMR measurement devices within the subsurface formation that contains the hydrocarbons;
performing one or more borehole NMR measurements with said one or more borehole NMR measurement devices; and
calibrating the NMR signals as measured by at least one surface NMR measurement device using the one or more borehole NMR measurements.

16. The method of claim 15 wherein calibrating the NMR signals as measured by at least one surface NMR measurement device comprises using the one or more borehole NMR measurements to develop a correlation relationship between T2 and a diffusion coefficient of at least one type of fluid within the subsurface formation, and using the developed correlation relationship to estimate a diffusion coefficient from surface NMR measurements, based on surface NMR measurements of T2 or T2* of the at least one type of fluid.

17. The method of claim 15 wherein calibrating the NMR signals as measured by at least one surface NMR measurement device comprises using the one or more borehole NMR measurements to determine a maximum relaxation time of altered heavy oil in the subsurface formation, and using the determined maximum relaxation time as a cutoff time for one or more of the surface NMR measurements, to distinguish NMR signals representing heavy oil from NMR signals too long to represent heavy oil.

18. A method for monitoring, via NMR measurements, properties of subsurface fluids within a subsurface formation, comprising:
deploying one or more borehole NMR measurement devices within a subsurface formation that contains hydrocarbons;
performing two or more borehole NMR measurements with said one or more borehole NMR measurement devices, wherein at least one of the borehole NMR measurement devices is deployed in-situ for longer than one day, and wherein the two or more borehole NMR measurements are performed over a period longer than one day, wherein at least one first borehole NMR measurement of said two or more borehole NMR measurements is performed at a first time before or during an induced alteration process applied, as part of an Enhanced Oil Recovery (EOR) production process, to the subsurface formation, wherein at least one second borehole NMR measurement of said two or more borehole NMR measurements is performed at a second time during or after the induced alteration process applied to the subsurface formation;
detecting, for each of the two or more borehole NMR measurements, NMR signals from one or more types of underground pore fluids within said subsurface formation;
analyzing the NMR signals for each of the two or more borehole NMR measurements to determine, for each of the two or more borehole NMR measurements, one or more properties of the subsurface formation or fluid, wherein the one or more properties comprise at least one property selected from the group comprising: NMR signal amplitude, NMR relaxation times, NMR relaxation time distribution, formation porosity, formation permeability, fluid type, fluid volume fraction, hydrocarbon saturation, fluid diffusion coefficient, fluid viscosity, and formation wetting state; and
determining a change in at least one property of the subsurface formation or fluid between the at least one first borehole NMR measurement at the first time before or during the induced alteration process applied to the subsurface formation, and the at least one second borehole NMR measurement performed at a second time during or after the induced alteration process applied to the subsurface formation.

19. The method of claim 18 wherein the hydrocarbons comprise non-native hydrocarbons present as contamination the subsurface formation, and wherein the induced alteration process comprises at least a portion of a contaminant remediation process.

20. The method of claim 19 wherein deploying the one or more borehole NMR measurement devices comprises permanently installing the one or more borehole NMR measurement devices in one or more backfilled boreholes in the subsurface formation.

21. The method of claim 19 wherein deploying the one or more borehole NMR measurement devices comprises deploying an array of borehole NMR measurement devices at multiple different positions within the subsurface formation.

22. The method of claim 18, further comprising calibrating NMR signals as measured by at least one surface NMR measurement device using the one or more borehole NMR measurements.

23. The method of claim 18 wherein the determined change comprises one or more of a longer T2 NMR relaxation time component and a higher fluid diffusion coefficient measured at the second time than measured at the first time, and further comprising correlating the determined change to an amount of pore space in a zone of the subsurface formation that has been flushed by water, steam, or brine.

24. An NMR measurement control apparatus adapted to control NMR measurements of properties of subsurface fluids within a subsurface formation during induced alteration processes, the NMR measurement control apparatus comprising:

an NMR measurement scheduler adapted to perform two or more surface NMR measurements with a surface NMR measurement device comprising one or more surface loops or antennae arranged non-invasively near an Earth surface, wherein at least one first surface NMR measurement of said two or more surface NMR measurements is performed at a first time before or during an induced alteration process applied to the subsurface formation, wherein at least one second surface NMR measurement of said two or more surface NMR measurements is performed at a second time during or after the induced alteration process applied to the subsurface formation, and wherein the NMR measurement control apparatus is adapted to schedule the two or more surface NMR measurements according to a rate or stage of the induced alteration process;

wherein the surface NMR measurement device is adapted to detect, for each of the two or more surface NMR measurements, NMR signals from one or more types of underground pore fluids within said subsurface formation;

wherein the surface NMR measurement device is adapted to analyze the NMR signals for each of the two or more surface NMR measurements to determine, for each of the two or more surface NMR measurements, one or more properties of the subsurface formation or fluid, wherein the one or more properties comprise at least one property selected from the group comprising: NMR signal amplitude, NMR relaxation times, NMR relaxation time distribution, formation porosity, formation permeability, fluid type, fluid volume fraction, hydrocarbon saturation, fluid diffusion coefficient, fluid viscosity, and formation wetting state; and a subsurface formation or fluid property monitor configured to determine a change in at least one property of the subsurface formation or fluid between the at least one first surface NMR measurement at the first time before or during the induced alteration process applied to the subsurface formation, and the at least one second surface NMR measurement performed at a second time during or after the induced alteration process applied to the subsurface formation.

* * * * *